United States Patent [19]
Kawai

[11] Patent Number: 4,697,891
[45] Date of Patent: Oct. 6, 1987

[54] FOCAL LENGTH VARIABLE LENS APPARATUS

[75] Inventor: Tohru Kawai, Kanagawa, Japan

[73] Assignee: Canon Kabushiki Kaisha, Tokyo, Japan

[21] Appl. No.: 646,633

[22] Filed: Aug. 31, 1984

[30] Foreign Application Priority Data

Sep. 2, 1983 [JP] Japan ................. 58-162309

[51] Int. Cl.⁴ .............. G02B 7/11; G02B 15/14
[52] U.S. Cl. ...................................... 350/429
[58] Field of Search ................. 350/429; 355/57

[56] References Cited

U.S. PATENT DOCUMENTS

| | | | |
|---|---|---|---|
| 3,972,056 | 7/1976 | Toujimoto et al. | 355/57 |
| 4,161,756 | 7/1979 | Thomas | 350/429 |
| 4,491,396 | 1/1985 | Isobe et al. | 350/429 |

Primary Examiner—John K. Corbin
Assistant Examiner—Loha Ben

Attorney, Agent, or Firm—Toren, McGeady & Associates

[57] ABSTRACT

The present invention discloses a focal length variable lens apparatus in which a focal length variable lens system has a magnification varying system which, upon movement causes variation of the focal length of the entire system and a compensating system for compensating for the shift of an image plane resulting from the change of the focal length. The apparatus is provided with first computing apparatus for computing the position of the compensating system in accordance with the computed compensation obtained from information from the position of said magnification varying system moved position, second computing apparatus for computing the position of the compensating system in accordance with optically sensed image sharpness, and sequence control apparatus for initiating operation of the second computing apparatus after operation of the first computing apparatus.

12 Claims, 5 Drawing Figures

FOCAL LENGTH VARIABLE LENS APPARATUS

BACKGROUND OF THE INVENTION

1. Field of the Invention

This invention relates to a device for compensating for the shift of an image plane of a focal length variable lens system when the focal length is changed.

2. Description of the Prior Art

In general, with the focal length variable lens systems or zoom lens systems, when the magnification varying system or variator is moved by zooming to change the focal length, the sharp focus position is shifted. Therefore, despite the above-described optical system which has been adjusted to an in-focus condition before zooming, the sharp focus position is deviated from the in-focus condition by the zooming operation. For this reason, in the past, the compensating system for compensating for deviation of the above-described sharp focus position is operatively connected to the above-described variator by mechanical or electrical means so that the sharp focus position is constantly protected from zooming, as for example, disclosed in U.S. Pat. No. 4,161,756. However, this mechanical or electrical operating means for the variator and compensator requires great precision and accuracy. In order to fully satisfy this, the operating means would become very complex. This has been a great hindrance in reducing the size and weight of the focal length variable lens apparatus and in lowering the production cost.

To solve this, an automatic focus position detector for optically detecting the deviated state of the in-focus position may be used, and by the signal obtained therefrom, the compensator is moved to an electrically adjusted position with the help of an electric motor used as the driving source so that the image shift is compensated for, as proposed in U.S. Pat. No. 3,972,056. In this case, there is no need to use the mechanical or electrical interconnection between the variator and the compensator, thereby producing a simple structure, which is, of course, advantageous. But the above-described automatic focus position detecting device generally has detectable range limits of image shifts. A drawback was that the image shifted too far from the focal plane, and consequently was undetected. For this reason, when applied to such zoom lens systems which allow the image plane to shift from the focal plane by the movement of the variator when zooming, that is, which have long focal lengths, or such zoom lens systems which have high zoom ratios and are capable of closeup photography, there were problems of the image position falling outside the dynamic detection range of the automatic focus position detecting device so that compensation for the image shift became impossible and the response speed became slower.

With the foregoing situations in mind, the present invention has been proposed, its first object being the provision of a focal length variable lens apparatus in which upon movement of the magnification varying system, the image position shifts and the shift is compensated for in such a way that the position of the compensating system is first roughly adjusted in accordance with the moved position of the magnification varying system. After that, by a signal from a focus position detecting circuit, the position of the compensating system is accurately adjusted. An advantage is that even when applied to a focal length variable lens system which has a wide range of image shifts as the magnification varying system moves, without the necessity of employing any complicated mechanical or electrical interconnections between the varying system and the compensating system, it is always possible to accurately adjust the axial position of the compensating system to compensate for the image shift resulting from the movement of the magnification varying system.

Other objects of the invention will become apparent from the following description of the embodiments thereof.

SUMMARY OF THE INVENTION

A focal length variable lens apparatus includes a magnification power varying system which upon movement changes the focal length, a compensating system movable for compensating for the image shift resulting from the movement of the magnification power varying system, first adjusting means for computing a position to which the compensating system is to move to compensate the position information of the moved position of the magnification power varying system, second adjusting means for optically detecting the shift of an image plane and for computing a position to which the compensating system is to move to compensate for the image shift, and sequence control means causing operation of the first adjusting means to precede operation of the second adjusting means.

DETAILED DESCRIPTION OF THE PREFERRED EMBODIMENTS

The embodiments of the present invention will next be described based on the drawings.

Figure 1:
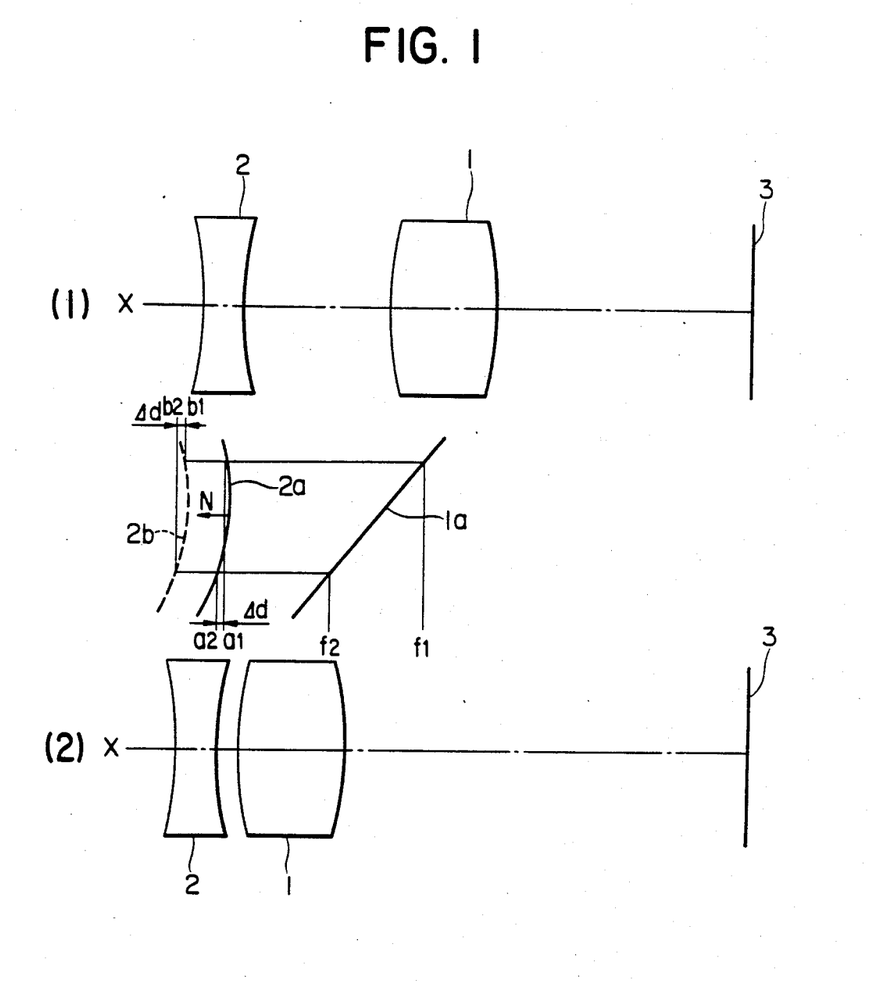
FIG. 1 is a schematic diagram of the optical system in a first embodiment of the present invention.

FIG. 1 schematically illustrates an optical system in a first embodiment of the focal length variable lens apparatus according to the present invention in the wide angle end (1) and the telephoto end (2).

In the drawing, a magnification power varying system 1 varies the focal length of the optical system, or a variator, and a compensating system 2 compensates for the shift of a plane at which a sharp image of an object to be photographed is formed resulting from the movement of the variator 1, or the compensator 2. The compensator 2 also has the focusing function for adjusting the position of the sharp image of the object in accordance with the object distance.

Then, with an object to be photographed at a certain distance, assuming that an image of the object is in sharp focus at a film plane 3 when in the wide angle end (1) shown in FIG. 1, then as the variator 1 moves along an optical axis X from the position (1) of FIG. 1 to the telephoto end (2), its locus becomes a solid line 1a. During this time, to maintain the in-focus condition, the compensator 2 must be moved along the optical axis X in a locus shown by solid curved line 2a relative to the movement of the variator 1.

Also, for an object distance different from that of the present case, to maintain the in-focus condition against the movement of the variator 1, the compensator 2 must be moved along the optical axis in another locus shown by a dashed curved line 2b. This is equivalent to that obtained by shifting the first named locus 2a by a distance Δd as a whole in the direction of arrow N. That is, the optical system of FIG. 1 is so constructed that the amount of movement of the compensator 2 is equalized for any object distance.

Figure 2:
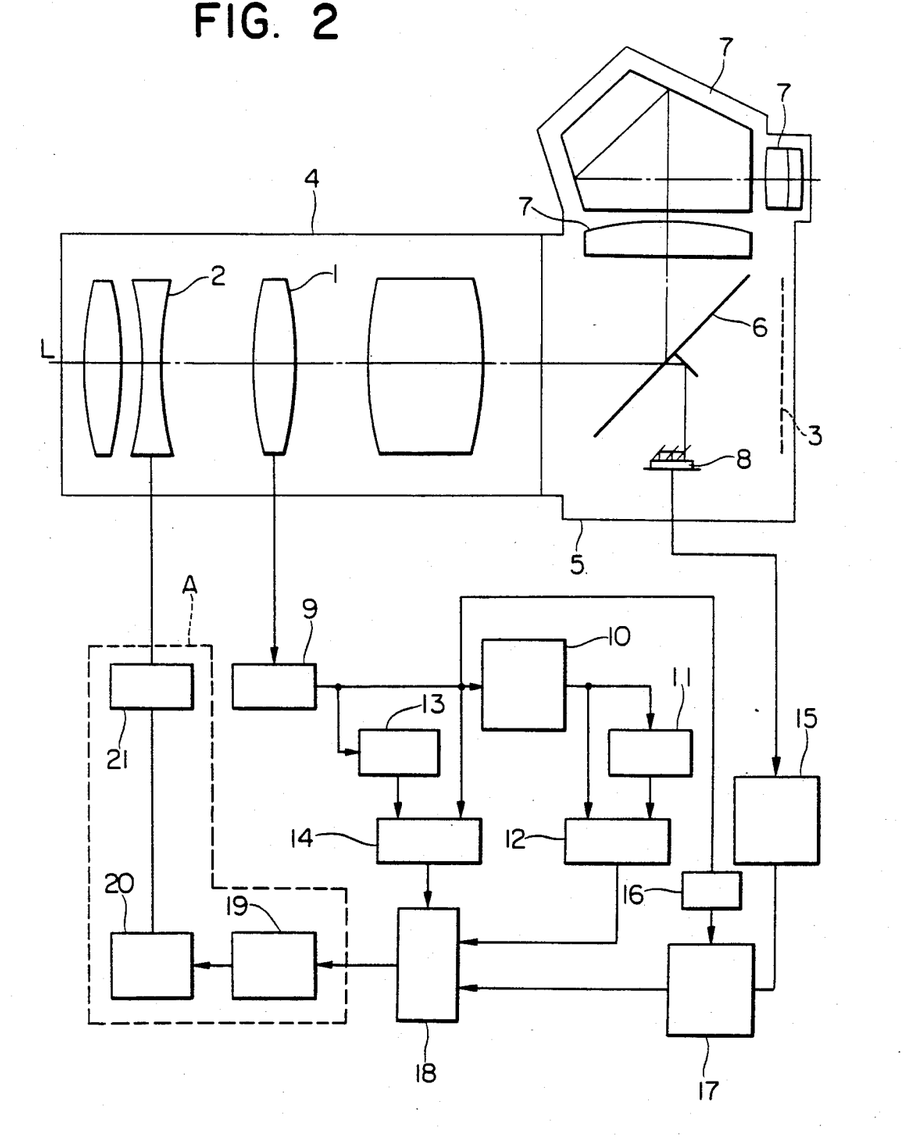
FIG. 2 is a block diagram of a focal length variable lens apparatus including the optical system of FIG. 1.

FIG. 2 illustrates a focal length variable lens apparatus including the optical system of FIG. 1 as a whole wherein the same reference numerals have been employed to denote the parts similar to those shown in FIG. 1 and their explanation is omitted.

In the drawing, a zoom lens barrel 4 contains the optical system of FIG. 1; a camera body 5 has an interior which has a movable mirror 6 to reflect light L coming from the object to be photographed and entering through the zoom lens barrel 4 to a finder optical system 7 and a focus position detecting element 8; an encoder 9 produces an output signal representing the actual position of the variator 1; a signal converting circuit 10 produces an output signal representing the required amount of movement of the compensator 2 for a certain given object distance, in this instance, infinity, in relation to the output of the encoder 9; a memory circuit 11 temporarily memorizes the output of the signal converting circuit 10; a subtraction circuit 12 computes the difference between the output of the signal converting circuit 10 and the output of the memory circuit 11; another memory circuit 13 temporarily memorizes the output of the encoder 9 by a signal from a control circuit (not shown) in synchronization with the first memory circuit 11; a comparison circuit 14 compares the output of the encoder 9 with the output of the memory circuit 13; a focus position detecting circuit 15 of known construction detects the shifted state of the image; another signal converting circuit 16 produces an output representing the responsiveness of the compensator 2 depending on the concurrent focal length from the position of the variator 1 detected by the output of the encoder 9; a compensator movement computing circuit 17 computes the required movement of the compensator 2 for the image shift based on the output of the focus position detecting circuit 15 and the output of the signal converting signal 16; a gate 18 selects either one of the outputs of the subtraction circuit 12 and the compensator movement computing circuit 17 to be placed on its output, depending on the output of the computer circuit 14; a pulse converting circuit 19 converts the output of the gate 18 to pulses; a pulse motor drive circuit 20 is responsive to the output of the pulse converting circuit 19 for driving a pulse motor 21. The compensator 2 is driven by the pulse motor 21 for automatic compensation of the image shift.

Next, the operation of this embodiment is described based on FIGS. 1 and 2. At first, the compensator 2 is assumed to have been manually moved to promote focusing and to be in focus. After that, the variator 1 is assumed to change its position from (1) of FIG. 1 to (2) by a zooming operation. Then the signal representing the position of the variator 1 produced from the encoder 9, which depends on the position of the variator 1, changes from f1 to f2. Then, responsive to each of outputs f1 and f2 of the encoder, the signal converting circuit 10 produces an output signal representing the position of the compensator 2 in order to compensate for the image shift, assuming that the object to be photographed is at infinity.

For example, suppose that for the outputs f1 and f2 of the encoder 9, the signal converting circuit 10 produces output signals representing the positions a1 and a2 in the locus 2a of the compensator 2. The output of the signal converting circuit 10 is memorized in the memory circuit 11 for a prescribed time. During this time, the variator 1 is being moved. When the output of the signal converting circuit 10 changes from a1 to a2, the signals a1 and a2 are applied to the subtraction circuit 12 where their difference Δd, with inclusion of the sign, is computed. That is, in the subtraction circuit 12, the computation:

$$a1 - a2 = \Delta d$$

is performed. Also, the optical system of FIG. 1 operates in a manner as described above, so that no matter what position the object to be photographed may take, if the variator 1 has moved, a given distance the required movement of the compensator 2 is an equivalent value. Therefore, the object is not necessarily at infinity, but may be at any distance. Even if this is so, the aforementioned Δd can be obtained. In other words, assuming that the object lies at a certain finite distance for which the adjusted position of the compensator 2 is represented by another locus shown by the dashed line 2b of FIG. 1, then the signal converting circuit 10 produces different output signals b1 and b2 from the aforementioned signals a1 and a2. But from the subtraction circuit 12, a result $$b1 - b2 = \Delta d$$

is obtained. Therefore, the signal converting circuit 10 may be set so that the signal representing the adjusted position of the compensator 2, relative to the position of the variator 1, remains the same despite any position assumed by the object.

The output of the encoder 9 is applied to the signal converting circuit 16 which in turn produces an output signal k2 representing the degree of responsiveness of the compensator 2 with the signal f2 representing the zoomed position of the variator 1. Meanwhile, a concurrent shift of the image Δe is produced from the focus position detecting circuit 15 and is computed in the compensator movement detecting circuit 17 to obtain the distance the compensator 2 is to be moved. In other words, as the image shift changes relative to variation of the focal length, it is divided by the focal length dependent responsiveness of the compensator 2 to evaluate the required movement of the compensator 2 to compensate for the image shift. That is, applied to the compensator movement computing circuit 17 are the output k2 of the signal converting circuit 16 and the output Δe of the focus position detecting circuit 15 to compute the required movement Δγ of the compensator 2 to constantly maintain the position of the image plane based on the following formula:

$$\Delta\gamma = \Delta e / k2$$

The comparator circuit 14 compares the signal f2 produced from the encoder 9 corresponding to the present position of the variator 1, with the signal f1 produced from the memory circuit 13, corresponding to that position of the variator 1 which occurred before the zooming operation which is synchronized with the memory circuit 11, thereby judging whether or not zooming has been carried out, controlling the gate 18. Applied to the gate 18 are the signal Δd of the corresponding movement of the compensator 2 to the movement of the variator 1 from the subtraction circuit 12 and the signal Δγ of the corrected movement of the compensator 2 from the compensator movement computing circuit 17, which corresponds to the image shift produced from the focus position detecting circuit 15. In this case, when the variator 1 is moved by the zooming operation, the position signal of the variator 1 changes from f1 to f2. Responsive to this, the comparator circuit 13 causes the gate 18 to first produce the signal Δd of the corrected movement of the compensator 2 obtained corresponding to the change in position of the variator 1. And, the pulse converting circuit 19 receives this signal Δd and produces a pulse signal to the drive circuit 20 for driving the pulse motor 21 so that the compensator 2 is moved the required corrected distance in the direction of that sign. Thereby corresponding to the movement of the variator 1, the compensator 2 automatically moves to compensate for the image shift.

However, in general, the position signal from the encoder 9, representing the position of the variator 1, is formed by a digital code plate or the like. Therefore, the position of the variator 1 is expressed by an extremely inaccurate position signal. For this reason, even when the movement of the compensator 2 is carried out by the signal Δd of the aforementioned required correction distance, a phenomenon in which the image plane is more or less shifted from the film plane occurs. On this account, this remaining fraction of the image plane shift is accurately compensated for by the signal Δγ obtained from the compensator movement computing circuit 17. That is, if the zooming operation is not repeated so that the position signal of the variator 1 is left unchanged from f2, the comparator circuit 14 detects this, and causes the gate 18 to produce the signal Δγ, from the compensator movement computing circuit 17. Then, this signal Δγ is also converted to a pulse signal by the pulse converting circuit 19, which is then applied to the pulse motor drive circuit 20. Thereby the pulse motor 21 rotates, moving the compensator 2 so that the aforementioned image shift from the film plane 3 is now accurately compensated for.

Of course, in such a case even after the gate 18 has produced the signal Δd corresponding to the moved position of the variator 1, the variator 1 continues moving, because the comparator circuit 14 detects this, the signal corresponding to the moving signal of the variator 1 is produced again from the gate 18. Thus, the rough adjustment of the position of the compensator 2 is repeated. Then, when the movement of the variator 1 stops, the position of the compensator 2 is finely adjusted by the output of the compensator movement circuit 17.

In the summary of the foregoing, responsive to a zooming operation, a first computing means comprised of the encoder 9, the signal converting circuit 10, the memory circuit 11 and the subtraction circuit 12, first computes the required amount of movement of the compensator 2 as the compensating system from the moved position of the variator 1 as the magnification power varying system and roughly adjusts the position of the compensator 2. In sequence thereto, second computing means comprising the focus detecting element 8, the focus detecting circuit 15 and the compensator movement computing circuit 17, optically detects the image shift and finely adjusts the position of the compensator 2. And the sequence of operations of the first and second computing means is controlled by the gate 18 which acts as the sequence control means.

Figure 3:
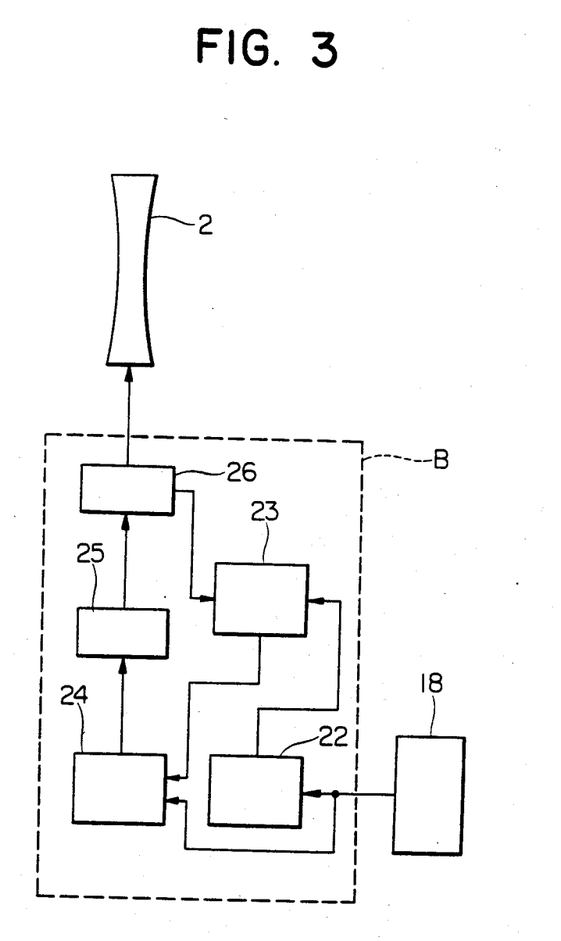
FIG. 3 is a block diagram of a modification of a portion of the apparatus of FIG. 2.

FIG. 3 illustrates another example of block A of FIG. 2, which is constructed without using the pulse motor 21. Block A of FIG. 2 may be replaced by block B of FIG. 3 without alternating any other portions. Explaining FIG. 3, the signal from the gate 18 of FIG. 2 is converted to a number of pulses by a pulse converting circuit 22. This pulse number is memorized in a presettable down counter 23. In the meantime, the signal from the gate 18 is directly applied to a motor drive circuit 24. Thereby a motor 25 rotates to move the compensator 2. The amount of rotation of the motor 25 is also measured by a pulse generator 26 constructed from a digital code plate and the like, and its pulse number is applied to the presettable down counter 23. In the presettable down counter 23, the pulse number set by the pulse converting circuit 22 is counted down by the pulse signal from the pulse generator 26. Upon detection that the content of the counter 23 has become zero, the operation of the motor drive circuit 24 stops, thus terminating the adjusting operation of the compensator 2.

Figure 4:
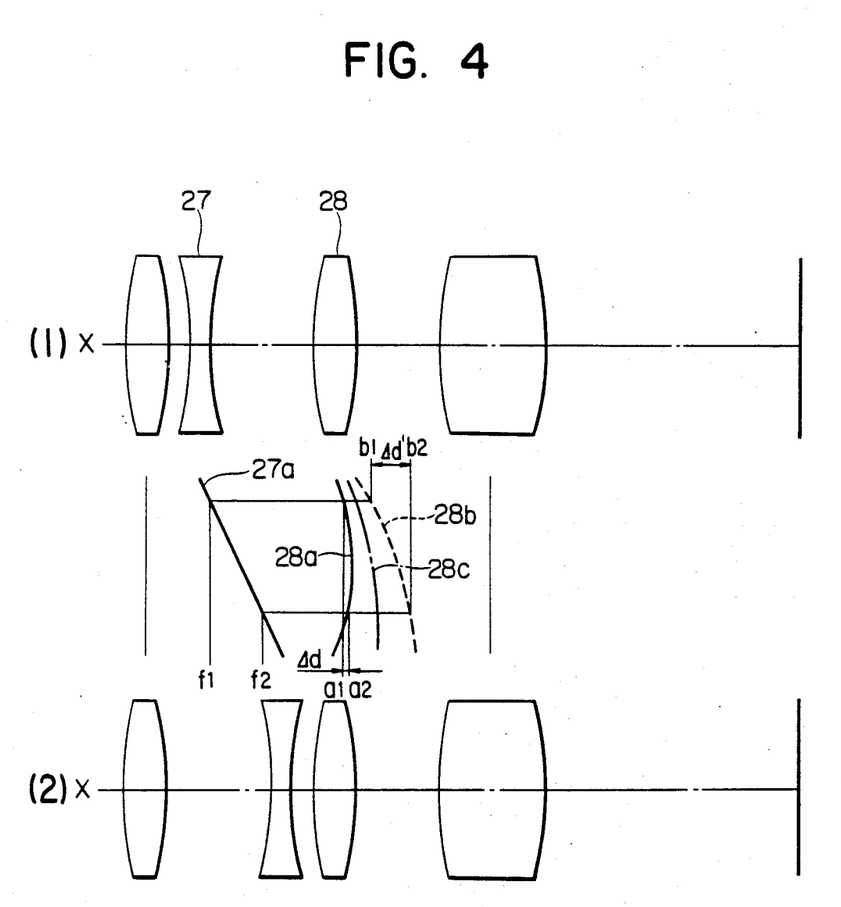
FIG. 4 is a schematic diagram of the optical system in a second embodiment of the present invention.
Figure 5:
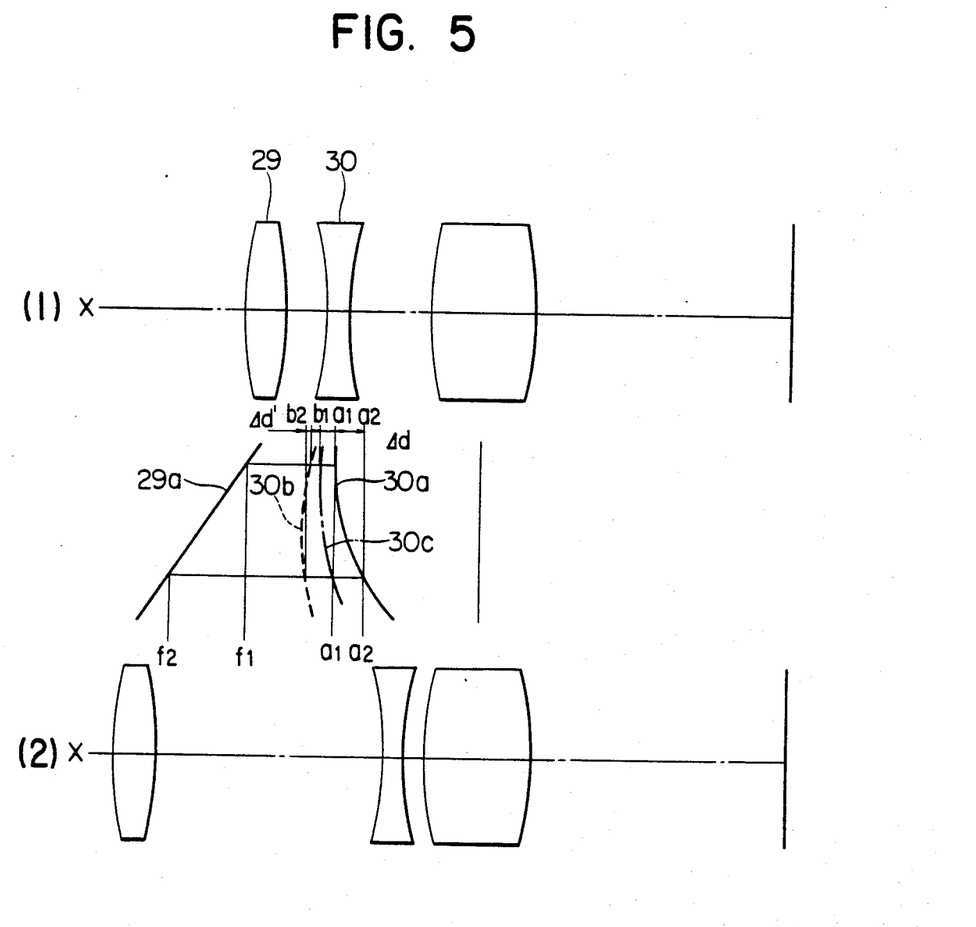
FIG. 5 is a schematic diagram of the optical system in a third embodiment of the present invention.

FIGS. 4 and 5 illustrate focal length variable optical systems according to second and third embodiments, respectively. These are each different from the first embodiment in that the required amount of movement of a compensator 28 or 30 relative to the movement of a variator 27 or 29 varies with the object distance. (For example, Δd varies to Δd' as shown in the drawings). In this case, therefore, the signal converting circuit 10 of FIG. 2 may be set up under an ideal condition in which the object lies at an intermediate point in the focusing range, from infinity to the minimum, for every position of the variator 27 or 29. That is, in FIGS. 4 and 5, as the variator 27 or 29 moves along the optical axis X in a locus 27a or 29a, the locus of movement of the compensator 28 or 30 along the optical axis X compensates for the image shift which is assumed to be 28a or 30a for the object at infinity, and 28b or 30b for the object at the minimum. Under this condition, it is necessary only to set up the signal converting circuit 16 so that the compensator 28 or 30 moves along the optical axis X in an almost intermediate locus 28c or 30c. And, the other parts are exactly the same in construction and arrangement as those in the first embodiment.

Because the image shift resulting from the movement of the variator 27 or 29 when zooming is compensated to some extent by the compensator 28 or 30, there is no possibility of a large image shift occurring throughout the entire zooming range. Therefore, since it is similar to the first embodiment, the remaining image shift can be reliably and accurately compensated for by the signal from the focus position detecting circuit 15.

It should be noted that in the foregoing embodiments, the first computing means for roughly computing the position of the compensator 28, 30 makes use of electrical means. But conventional mechanical means may be used as well. In this case, the first computing means because it is preliminary, does not necessitate such precision and accuracy, and, therefore, may have a very simple structure form.

Also, the foregoing embodiments each employ a zoom type in which as the object distance changes, the set position of the compensator 28, 30 must be changed, despite the same focal length, has to be changed. Therefore, the information about the actual position of the variator only, does not suffice for determining the required position of the compensator. In application to other types of zoom lenses in which it is possible from the information about the position of the variator alone, to determine the required position of the compensator in a one-to-one correspondence with the position of the variator independent of the object distance, (for example, that type which is disclosed in U.S. Pat. No. 4,161,756 cited above as the prior art example) the first computing means may be made up so as to adjust the position of the compensator in accordance with only the moved position of the variator.

As has been described above, according to the present invention, in the focal length variable lens system having a magnification power varying system movable for varying the focal length of the entire system, and a compensating system for compensating for the shift of an image plane resulting from the change of the focal length, the moved position of the aforementioned magnification power varying system is computed to derive the required amount of movement of the compensating system for roughly compensating for the image shift by the first computing means. After that, the degree of sharpness of the image at the film plane is optically measured to finely re-adjust the position of the compensating system by the second computing means. Even in application to the high range focal length variable lens system, the position of the compensating system relative to the magnification power varying system can always be reliably and accurately adjusted by an operating device of a simple structure. Thus, the present invention makes it possible to provide a very excellent focal length variable lens apparatus.

What is claimed is:

1. A focal length variable optical apparatus, comprising:
   (a) a first optical system for changing the focal length by shifting its position;
   (b) a second optical system for compensating deviation in an image forming position caused by the shifting of the first optical system by shifting its position;
   (c) first computing means for computing a position to which the second optical system is to be shifted on the basis of the position to which the first optical system has been shifted, said first computing means including encoder means for detecting the position to which the first optical system has been shifted;
   (d) second computing means for computing a position to which the second optical system is to be shifted to perform the compensation by optically detecting the deviation of the image forming position; and
   (e) control means for actuating the second optical system on the basis of the computation result of the first computing means and the computation result of the second computing means, said control means shifting the position of said second optical system on the basis of the computation result of the first computing means and then shifting the position of the second optical system on the basis of the computation result of the second computing means.

2. An apparatus according to claim 1, wherein the control means includes electric driving means for shifting the position of the second optical system.

3. An apparatus according to claim 1, wherein the first computing means computes the position to which the second optical system is to be shifted as an average position of a position to which the second optical system is to be shifted for a position to which the first optical system is shifted when an object is to be focused is at a longest distance and a position to which the second optical system is to be shifted for a position of the first optical system when the object is to be focused is at a closest distance.

4. An apparatus according to claim 1, wherein the control means includes restriction means which prohibits the shifting of the second optical system on the basis of the computation result of the second computing means while the first optical system is shifting.

5. A focal length variable optical apparatus, comprising:
   (a) a first optical system for changing the focal length by shifting its position;
   (b) a second optical system for compensating deviation in an image forming position caused by the shifting of the first optical system by shifting its position;
   (c) encoder means for detecting the positions of the first optical system before and after the shifting of the same;
   (d) first computing means for computing a position to which the second optical system is to be shifted for the compensation on the basis of an output of the encoder means;
   (e) second computing means for computing a position to which the second optical system is to be shifted to perform the compensation by optically detecting the deviation of the image forming position; and
   (f) control means for actuating the second optical system on the basis of the computation result of the first computing means and the computation result of the second computing means, said control means shifting the position of said second optical system on the basis of the computation result of the first computing means and then shifting the position of the second optical system on the basis of the computation result of the second computing means.

6. An apparatus according to claim 5, wherein the control means includes electric driving means for shifting the position of the second optical system.

7. An apparatus according to claim 5, wherein the first computing means computes the position to which the second optical system is to be shifted as an average position of a position to which the second optical system is to be shifted for a position to which the first optical system is shifted when an object is to be focused is at a longest distance and a position to which the second optical system is to be shifted for a position of the first optical system when the object is to be focused is at a closest distance.

8. An apparatus according to claim 5, wherein the control means includes restriction means which prohibits the shifting of the second optical system on the basis of the computation result of the second computing means while the first optical system is shifting.

9. A focal length variable optical system, comprising:
   (a) first and second optical systems for magnification variation and compensating deviation of an image forming position due to the magnification variation, said first and second optical systems performing respectively the magnification variation and the compensation by shifting their positions;

(b) first computing means for computing a position to which the second optical system is to be shifted on the basis of the position to which the first optical system has been shifted, said first computing means including encoder means for detecting the position to which the first optical system has been shifted;

(c) second computing means for computing a position to which the second optical system is to be shifted to perform the compensation by optically detecting the deviation of the image forming position; and (d) control means for actuating the second optical system on the basis of the computation result of the first computing means and the computation result of the second computing means, said control means shifting the position of said second optical system on the basis of the computation result of the first computing means and then shifting the position of the second optical system on the basis of the computation result of the second computing means.

10. An apparatus according to claim 9, wherein the control means includes electric driving means for shifting the position of the second optical system.

11. An apparatus according to claim 9, wherein the first computing means computes the position to which the second optical system is to be shifted as an average position of a position to which the second optical system is to be shifted for a position to which the first optical system is shifted when an object is to be focused is at a longest distance and a position to which the second optical system is to be shifted for a position of the first optical system when the object is to be focused is at a closest distance.

12. An apparatus according to claim 9, wherein the control means includes restriction means which prohibits the shifting of the second optical system on the basis of the computation result of the second computing means while the first optical system is shifting.

* * * * *